Aug. 31, 1943.  E. J. KARP  2,328,076
DRIVING UNIT
Filed July 23, 1942
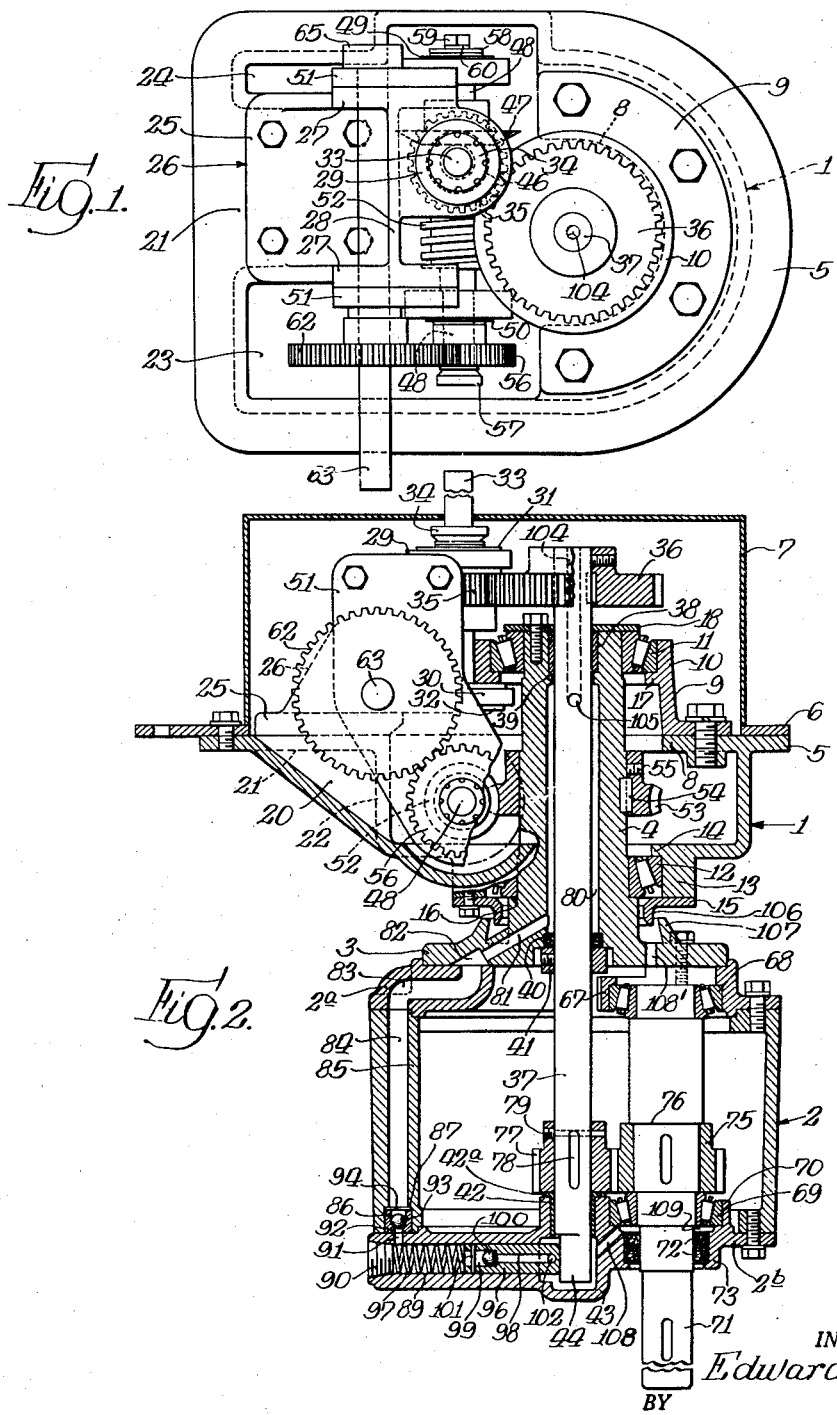
INVENTOR.
Edward J. Karp,
BY
Brown Jackson, Boettcher & Dienner
Attys.

Patented Aug. 31, 1943

2,328,076

UNITED STATES PATENT OFFICE 2,328,076

DRIVING UNIT

Edward J. Karp, Cicero, Ill., assignor to G. S. Blakeslee & Co., Cicero, Ill., a corporation of Illinois Application July 23, 1942, Serial No. 452,067

9 Claims. (Cl. 184—6)

This invention relates to power transmitting means, and has to do with driving units useful for various purposes but particularly suitable for use in mixing machines employed in hotels, restaurants and other establishments for mixing and treating comestibles.

In machines of the character above referred to, used for mixing and treating comestibles, it is desirable that the machines be quiet in operation, that the moving parts thereof be adequately lubricated and, for obvious reasons, that possibility of the lubricating oil dripping into the comestibles being treated be avoided. My invention is directed to a driving unit suitable for use in mixing machines of the character stated, in which the parts are adequately lubricated and are quiet in operation and leakage of oil into the food stuffs being treated is effectively guarded against. More specifically, I provide upper and lower gear housings, with the later housing rotatably supported from the upper housing and provided with an attachment receiving shaft eccentric to its axis of rotation, this shaft extending through the bottom of the lower housing with oil seal means thereabout, means being provided for rotating the lower housing and for driving the attachment receiving shaft, there also being provided an oil pump which withdraws oil from the lower housing at a point above and adjacent the oil seal means, thus guarding against leakage of oil therethrough, this pump discharging the oil into the upper housing and the oil flowing over and about the moving parts in the upper housing and thence into the lower housing and over and about the moving parts in the latter, thus assuring adequate lubrication. Further objects and advantages of my invention will appear from the detail description.

In the drawing:

Figure 1 is a plan view of a driving unit embodying my invention, with the cover of the upper gear housing removed; and Figure 2 is a central vertical sectional view through the driving unit of Figure 1, certain parts being shown in elevation.

While the driving unit of my invention may be used for various purposes, it is particularly suitable for use with the mixing machine disclosed in my copending application, Serial No. 390,229, filed April 25, 1941.

The driving unit comprises an upper gear housing 1 and a lower gear housing 2, to the top 2ᵃ of which is bolted base flange 3 of a tubular spindle 4 of stepped formation exteriorly, extending upward within housing 1. The latter housing is provided with an exterior peripheral flange 5 to which is bolted a flange 6, at the lower end of and welded or otherwise suitably secured to a sheet metal cover 7 of appropriate shape. Upper housing 1 is further provided with an interior flange 8 of approximately semi-circular shape in plan, as shown more clearly in Figure 1, to which is bolted an angle bracket 9 provided at its upper end with a flanged collar 10. A roller bearing assembly 11 of known type is mounted in collar 10, coaxially with a similar roller bearing assembly 12 mounted in a flanged collar 13 extending from the bottom of housing 1. The bearing assembly 12 is confined between flange 14 at the upper end of collar 13 and a retaining ring 15 bolted to the lower end of collar 13, being thus restrained against axial movement.

Spindle 4 extends upwardly through the inner members or cones of the bearing assemblies 11 and 12 and is restrained against upward movement by contact of shoulder 16 of this spindle with the cone of the lower bearing assembly 12. The upper bearing assembly 11 is confined between flange 17 of collar 10 and a washer 18 bolted to the upper end of spindle 4, this washer contacting the upper end of the inner race or cone of assembly 11 and restraining the spindle 4 against downward movement. In that manner the lower housing 2 is supported for rotation from the upper housing 1 and is restrained against vertical movement relative thereto.

The portion of housing 1 opposite to interior flange 8 is formed to provide a boxing 20 comprising a horizontal top wall or platform 21 and an inner vertical wall 22 extending from the inner edge of platform 21 to the bottom wall of housing 1, there being a relatively wide trough or depression 23 within housing 1 at one side of boxing 20 and a relatively narrow trough 24 at the other side thereof. Base plate 25 of a bracket 26 seats upon and is bolted to platform 21. Bracket 26 is provided at each side thereof with a flat upwardly projecting plate 27. The plates 27 are connected by a web 28 extending transversely of base plate 25 adjacent the inner end thereof, this web being provided with an upper inwardly projecting bearing retainer collar 29 and a lower bearing retainer collar 30. Antifriction bearing assemblies 31 and 32 of known type, which may be similar to the bearing assembly 11, are appropriately mounted in the collars 29 and 30 which, as will be understood, may be provided with interior flanges similar to flange 17 of collar 19 for retaining the bearing assemblies in position.

A drive shaft 33, which may be driven in any suitable manner, extends through the top of cover 7 and downward through the bearing assemblies 31 and 32, by means of which this shaft is mounted for rotation. An abutment member or collar 34 is suitably secured on shaft 33 at the upper end of bearing assembly 31 and cooperates therewith for restraining shaft 33 against downward movement. A pinion 35 is secured on shaft 33 at the lower end of bearing assembly 31, with which it cooperates for restraining shaft 33 against upward movement. Pinion 35 meshes with a spur gear 36 secured on the upper end of a countershaft 37 extending downward through spindle 4 into the lower gear housing 2. Shaft 37 is rotatably mounted through a bearing bushing 38 mounted in the upper end of spindle 4 and confined between washer 18 and an interior shoulder 39 of spindle 4. At the lower end of spindle 4 shaft 37 passes through an oil seal member 40, of known type mounted in a recess in spindle 4 and confined between the upper end of such recess and a collar 41 secured on shaft 37. At its lower portion shaft 37 is mounted in a flanged bushing 42 in the upper portion of an oil well or sump 43 at the bottom 2$^b$ of housing 2, and the lower end of shaft 37 is formed to provide an eccentric 44 disposed within sump 43.

Drive shaft 33 is provided, at its lower end, with a bevel gear 46 suitably secured thereon and meshing with a bevel gear 47 secured on a horizontal lay shaft 48 rotatably mounted, by means of suitable known bearing assemblies 49 and 50, in the lower ends of angular bracket arms 51 bolted to and extending downward and inward from the side plates 27 of bracket 26. A worm 52 is secured on lay shaft 48 and meshes with a worm wheel 53 secured on spindle 4, by means of a key 54 and a set screw 55. A spur pinion 56 is keyed on one end of lay shaft 48 and is confined between bearing assembly 50 and a nut 57 of known type screwing onto shaft 48, there being a washer 58 mounted on the other end of shaft 48 and confined against movement endwise thereof by cap screw 59 threading into the end of shaft 48 and an associated lock washer 60. The washer 58 and the pinion 56, in conjunction with nut 57 and the bearing assemblies 49 and 50, restrain the lay shaft 48 against endwise movement in either direction. Pinion 56 meshes with a spur gear 62 secured on a power takeoff shaft 63 rotatably mounted through bracket arms 51 and through side plates 27 of bracket 26, above base plate 25 thereof. Takeoff shaft 63 is restrained against endwise movement by means of gear 62 and a collar 65 secured upon the other end of shaft 63, in cooperation with the bracket arm 51. It will be understood that cover 7 may be provided with a suitable opening through which the takeoff shaft 63 extends and, if desired, may also be provided with suitable known means for effecting an oil tight seal about this shaft.

The top or cover 2$^a$ of the lower housing 2 is bolted to the body thereof and is provided with an interior bearing assembly retaining ring 67, conveniently formed integrally with cover 2$^a$. The ring 67 receives a bearing assembly 68 similar to the bearing assembly 11 and disposed coaxially with a similar bearing assembly 69 mounted in a collar 70 formed integrally with and extending upward from the bottom or lower closure member 2$^b$, bolted to the lower end of the body of the lower housing 2. A driven shaft 71 of step formation is rotatably mounted by means of the bearing assemblies 68 and 69, by which it is restrained against endwise movement in either direction, this shaft being disposed eccentrically to countershaft 37 and to spindle 4 about the axis of which lower gear housing 2 revolves. Shaft 71 extends downward through the bottom of housing 2 and projects therebelow for reception of various attachments to be used in the mixing or treatment of food stuffs, as explained more fully in my above identified copending application. Since shaft 71 is rotated it is necessary that this shaft and its associated bearings and other moving parts be lubricated, and it is also important that the oil or lubricant does not leak out around shaft 71 and enter the food stuffs or comestibles being mixed or otherwise treated by the attachment mounted on shaft 71. To that end I provide sealing members 72 of known type, mounted in an interiorly flanged collar 73 extending downward from the bottom or lower closure member 2$^b$ of housing 2, the sealing members providing a substantially oil tight seal about shaft 71. A spur pinion 75 is keyed on shaft 71 and is confined between shoulder 76 thereof and the inner race or cone of the bearing assembly 69. Pinion 75 meshes with a pinion 77 secured on countershaft 37, by a key 78 and a pin 79, or in any other suitable manner. Pinion 77 seats on flange 42$^a$ at the upper end of bushing 42, thus restraining countershaft 37 against downward movement, collar 41 restraining this shaft against upward movement, whereby countershaft 37 is held against endwise movement in either direction.

Spindle 4 is of greater interior diameter, for the major portion of its length, than the countershaft 37, leaving a space 80 about the upper portion of shaft 37, closed at one end by the sealing member 40 and at its other end by shaft 37 and bushing 38. Spindle 4 is provided with an inclined duct 81 opening into the lower end of space 80, the lower end of this duct opening into a recess 82 in the underface of base flange 3 of spindle 4, which recess overlies the upper end of a duct 83 formed in cover 2$^a$. The lower end of duct 83 opens into the upper end of a duct 84 extending through a rib 85 at one side of the body of the lower housing 2. At its lower end rib 85 is recessed for reception of a thimble 86 confined between shoulder 87 of rib 85 and the lower closure member 2$^b$. This closure member 2$^b$ is provided with an integral pump barrel 89, closed at its outer end by a screw plug 90, provided with a radially extending outlet opening 91 which registers with a restricted orifice 92, opening through the lower end of spindle 80 and controlled by a ball valve 93 upward movement of which is limited by a cross pin 94 at the upper end of thimble 86. A hollow piston 96 is mounted for reciprocation in pump barrel 89 and is yieldingly held with its inner end in contact with eccentric 44 of countershaft 37, by means of a compression coil spring 97 confined between plug 90 and the outer end of piston 96. Piston 96 is provided with an axial bore 98 extending from its inner end for the major portion of its length, this bore opening at its outer end into a bore 99 of increased diameter opening through the outer end of piston 96. The outer end of bore 98 is controlled by a ball valve 100 disposed in bore 99, outward travel of ball valve 100 being limited by a cross pin 101 secured in piston 96 adjacent the outer end thereof. At its inner end piston 96 is bored diametrically to provide, at each side thereof, an intake port 102 to facilitate flow of oil from sump 43 into bore 93 of the piston.

Countershaft 37 is provided with an axial bore 104 extending from its upper end and opening, at its lower end, into space 80, adjacent the upper end thereof, through an intersecting radial bore 105. It will be noted that the bearing assemblies 11 and 12, as well as the bearing assemblies 68 and 69, are open for flow of oil therethrough. Retaining ring 15 is provided with a depending neck 106, disposed in concentric spaced relation to the lower end portion of spindle 4 and extending downward into the upper end of a collar 107 formed on the upper face of base flange 3. The latter is provided with a duct 108' extending therethrough from the bottom of the channel defined by collar 107 and the adjacent portion of spindle 4, this duct overlying the upper end of the driven shaft 71. The gear housings 1 and 2 are thus provided with suitable passages for flow of oil downward through the upper housing 1 and thence into the lower housing 2 onto the upper end of shaft 71. It will be seen that when the drive shaft 33 is rotated, countershaft 37 and spindle 4 are rotated, the latter at relatively low speed, and shaft 71 is rotated about its own axis and revolves with lower gear housing 2 about the axis of spindle 4. The rotation of shaft 37 causes eccentric 44 thereof to force the pump piston 96 outward, in opposition to compression spring 97, which moves piston 96 inward as permitted by eccentric 44. The outward travel of piston 96 displaces the oil in barrel 89, between the piston and plug 90, forcing this oil through the discharge passage comprising the passage 91, thimble 86, ducts 84, 83, 82 and 81 and space 80, and thence through bore 105 and bore 104, the oil being discharged through the top of countershaft 37 above gear 36, over which it flows and from which it is distributed to the bearing assemblies and gearing associated with the drive shaft 33. The oil thus discharged into the upper gear housing flows downwardly therethrough, a portion of this oil flowing through the upper bearing assembly 11 and the oil from housing 1 flowing downward therefrom through the lower bearing assembly 12, into the space between collar 106 and the lower portion of spindle 4 and thence through duct 108' onto the upper end of shaft 71. The oil flows outward of shaft 71 to the bearing assembly 68 and thence downward along shaft 71 to the pinion 75, by means of which a portion of the oil is distributed to the pinion 77, the oil collecting in the lower portion of the lower gear housing 2 flowing downward through the lower bearing assembly 69 thereof to the top of the oil seal provided by the members 72. An inclined duct 108 opens from a space 109, between the bearing assembly 69 and the upper oil seal member 72, into the oil sump 43. During the inward travel of pump piston 96 under the influence of the compression spring 97, ball valve 100 is unseated and oil is displaced from sump 43 through the piston and into the outer portion of pump barrel 89, this oil being discharged through the upper end of countershaft 37 under pressure during the outward travel of the pump piston, in the manner above described. Since oil is continuously withdrawn from sump 43 and this sump communicates with the lower gear housing 2 at a point above and adjacent the oil seal means about shaft 71, oil is continuously withdrawn from above this seal means thereby guarding against seepage of oil about shaft 71, through the oil seal means, due to accumulation of a standing column of oil above the seal means. It will be appreciated that the shaft 71 is rotated at appreciable speed and that the oil seal means should not fit tightly about the shaft, which renders it difficult to prevent seepage of oil about shaft 71 below the seal means and entry of this oil into the food being mixed or otherwise treated which, for obvious reasons, is highly objectionable. I find that that difficulty can be avoided by having the intake of the pump connected to the lower gear housing at a point adjacent and preferably above the oil seal means associated with shaft 71, in the manner shown and described.

It will be understood that changes in construction and arrangement of parts of my invention may be resorted to without departing from the field and scope thereof, and I intend to include all such variations, as fall within the scope of the appended claims, in this application in which the preferred form only of my invention has been disclosed.

I claim:

1. In a driving unit of the character described, an upper gear housing, a drive shaft mounted therein, a lower gear housing, a countershaft mounted in said upper housing extending therefrom into said lower housing, means supporting said lower housing for rotation about the axis of said countershaft, a driven shaft rotatably mounted in said lower housing eccentric to said countershaft and extending downward beyond said lower housing, oil seal means about said driven shaft adjacent the bottom of said lower housing, means for rotating said lower housing and said countershaft comprising a gear secured on the upper portion of said countershaft, the latter having an oil outlet opening above said gear and an oil passage leading to said opening, a pinion secured on the lower portion of said countershaft within said lower housing, a pinion secured on said driven shaft meshing with said first pinion, said unit having passages therein for flow of oil from said upper housing into said lower housing, and pump means operated by said countershaft for raising oil from said lower housing through said passage of said countershaft and discharging it therefrom through said opening, said lower housing having an oil duct leading from said seal means to the intake of said pump means.

2. In a driving unit of the character described, an upper gear housing, a lower gear housing, a shaft rotatably mounted in said upper housing extending therefrom into said lower housing, means supporting said lower housing for rotation about the axis of said shaft, a driven shaft rotatably mounted in said lower housing eccentric to said first shaft and extending downward beyond said lower housing, oil seal means about said driven shaft adjacent the bottom of said lower housing, means for rotating said lower housing and said first shaft comprising gearing in said upper housing including a gear secured on the upper portion of said first shaft, the latter having an oil outlet opening above said gear and an oil passage leading to said opening, a pinion secured on said first shaft within said lower housing, a pinion secured on said driven shaft meshing with said first pinion, said unit having passages therein for flow of oil from said upper housing into said lower housing, and pump means operated by said first shaft for raising oil from said lower housing through said passage of said first shaft and discharging it through said opening, said lower housing having an oil duct leading from said seal means to the intake of said pump means.

3. In a driving unit of the character described, an upper gear housing, a lower gear housing, a shaft rotatably mounted in said upper housing extending therefrom into said lower housing, means mounting said lower housing for rotation about the axis of said shaft, a driven shaft mounted in said lower housing extending downward through the bottom thereof and driven from said first shaft, oil seal means about said driven shaft adjacent the bottom of said lower housing, means for driving said first shaft and said lower housing comprising gearing in said upper housing, the latter and said lower housing having passages for flow of oil from said upper housing into said lower housing, said first shaft having an oil passage and an outlet opening therefrom above said gearing, and an oil pump driven by said first shaft having its discharge connected to said passage and its intake connected to the interior of said lower housing above and adjacent said oil seal means.

4. In a driving unit of the character described, an upper gear housing, a lower gear housing rotatably supported from said upper housing, a driven shaft rotatably mounted in said lower housing eccentric to the axis of rotation thereof and extending downward through the bottom of said lower housing, oil seal means about said shaft adjacent the bottom of said lower housing, an oil pump, and means for driving said lower housing and said shaft and said pump comprising gearing in said upper housing, the latter and said lower housing having passages for flow of oil from said upper housing into said lower housing, said pump discharging into said upper housing above said gearing and having its intake connected to said lower housing above and adjacent said oil seal means.

5. In a driving unit of the character described, an upper gear housing, a lower gear housing having a tubular spindle secured thereto extending into and mounted for rotation in said upper housing, a shaft rotatably mounted through said spindle spaced therefrom providing a space about said shaft closed substantially oil tight at its ends, said lower housing having an oil sump in its lower portion, a pump having its intake connected to said sump, a driven shaft rotatably mounted in said lower housing eccentric to said spindle and extending through the bottom of said lower housing, oil seal means about said driven shaft adjacent the bottom of said lower housing, and means for rotating said first shaft and said spindle and for driving said driven shaft and said pump comprising gearing in said upper housing, said lower housing and said spindle having an oil passage leading from the discharge of said pump to the space between said spindle and said first shaft and the latter having a passage opening at one end into said space and at its other end into said upper housing above said gearing, said upper and lower housings having passages for flow of oil from said upper housing into said lower housing and the latter housing having an oil duct opening into said sump from above and adjacent said oil seal means.

6. In a driving unit of the character described, an upper gear housing, a lower gear housing having a spindle secured thereto extending into said upper housing, bearing assemblies open for oil flow therethrough rotatably mounting said spindle in said upper housing, a drive shaft rotatably mounted in said upper housing, a countershaft rotatably mounted through said spindle spaced therefrom providing a space about said countershaft closed at its ends, driving connections between said shafts comprising gearing above said spindle, gearing establishing driving connection between said drive shaft and said spindle, a driven shaft in said lower housing eccentric to said spindle extending through the bottom of said lower housing, upper and lower bearing assemblies open for oil flow therethrough rotatably mounting said driven shaft, oil seal means about said driven shaft adjacent and below the lower bearing assembly thereof, driving connections between said countershaft and said driven shaft, said countershaft having a passage opening at one end into said space and at its other end into said upper housing above said first gearing, said housings having passages for flow of oil from said upper housing into said lower housing with one thereof overlying said driven shaft, and an oil pump driven by said countershaft having its intake connected to said lower housing above and adjacent said oil seal means and its exhaust connected to said space.

7. In a driving unit of the character described, an upper gear housing, a lower gear housing having a spindle secured thereto extending into said upper housing, bearing assemblies open for oil flow therethrough rotatably mounting said spindle in said upper housing, a drive shaft rotatably mounted in said upper housing, said lower housing having an oil sump at its bottom, a countershaft mounted through said spindle spaced therefrom providing a space about said countershaft closed at its ends, said countershaft extending into said lower housing and having at its lower end an eccentric disposed in said sump, driving connections between said drive shaft and said countershaft and spindle comprising gearing above said spindle, a driven shaft in said lower housing eccentric to said countershaft extending through the bottom of said lower housing, upper and lower bearing assemblies open for oil flow therethrough rotatably mounting said driven shaft, oil seal means about said driven shaft adjacent and below the lower bearing assembly thereof, driving gearing between said countershaft and said driven shaft, said countershaft having a passage opening into said space and into said upper housing above said first gearing and said housings having passages for flow of oil from said upper housing into said lower housing with one thereof overlying said driven shaft, and a pump driven by said eccentric having its intake connected to said lower housing above and adjacent said oil seal means and its discharge connected to said space about said countershift.

8. In a drive unit of the character described, an upper gear housing, a lower gear housing rotatably supported from said upper housing, a driven shaft mounted in said lower housing eccentric to the axis of rotation thereof and extending through the bottom of said lower housing, oil seal means about said driven shaft adjacent the bottom of said lower housing, said housings having passages for flow of oil from said upper housing into said lower housing, an oil pump withdrawing oil from said lower housing at a point adjacent said oil seal means and discharging it into said upper housing, and means for driving said lower housing and said driven shaft and pump.

9. In a drive unit of the character described, an upper gear housing, a lower gear housing rotatably supported from said upper housing, a driven shaft mounted in said lower housing eccentric to the axis of rotation thereof and extending through the bottom of said lower housing, oil seal means about said driven shaft adjacent the bottom of said lower housing, said housings having passages for flow of oil from said upper housing into said lower housing, an oil pump withdrawing oil from said lower housing at a point above and adjacent said oil seal means and discharging it into said upper housing, and means for driving said lower housing and said driven shaft and pump.

EDWARD J. KARP.